United States Patent
Yakowenko et al.

(10) Patent No.: US 7,657,848 B2
(45) Date of Patent: Feb. 2, 2010

(54) COMPUTER-IMPLEMENTED NODE-LINK PROCESSING SYSTEMS AND METHODS

(75) Inventors: Jyoti Yakowenko, Raleigh, NC (US);
Sanjay N. Matange, Cary, NC (US);
Paul W. Layne, Cary, NC (US)

(73) Assignee: SAS Institute Inc., Cary, NC (US)

( * ) Notice: Subject to any disclaimer, the term of this patent is extended or adjusted under 35 U.S.C. 154(b) by 211 days.

(21) Appl. No.: 11/328,410

(22) Filed: Jan. 9, 2006

(65) Prior Publication Data

US 2007/0162859 A1 Jul. 12, 2007

(51) Int. Cl.
*G05F 3/048* (2006.01)

(52) U.S. Cl. .................. 715/853; 715/764; 715/781; 715/784; 715/810; 715/854; 345/672; 345/678; 345/684

(58) Field of Classification Search .................. 715/853, 715/854, 764, 781, 784, 810; 345/734, 672, 345/678, 684
See application file for complete search history.

(56) References Cited

U.S. PATENT DOCUMENTS

| | | | | |
|---|---|---|---|---|
| 4,613,946 | A * | 9/1986 | Forman | 715/853 |
| 5,295,243 | A | 3/1994 | Robertson et al. | |
| 5,333,254 | A * | 7/1994 | Robertson | 715/853 |
| 5,546,529 | A * | 8/1996 | Bowers et al. | 715/848 |
| 5,555,354 | A | 9/1996 | Strasnick et al. | |
| 5,565,888 | A | 10/1996 | Selker | |
| 5,590,250 | A | 12/1996 | Lamping et al. | |
| 5,619,632 | A | 4/1997 | Lamping et al. | |
| 5,670,984 | A * | 9/1997 | Robertson et al. | 345/585 |
| 5,689,287 | A * | 11/1997 | Mackinlay et al. | 345/427 |
| 5,786,820 | A * | 7/1998 | Robertson | 715/853 |
| 5,812,134 | A | 9/1998 | Pooser et al. | |
| 5,943,679 | A * | 8/1999 | Niles et al. | 715/247 |
| 6,057,843 | A | 5/2000 | Van Overveld et al. | |
| 6,204,850 | B1 | 3/2001 | Green | |
| 6,259,451 | B1 * | 7/2001 | Tesler | 345/419 |
| 6,281,899 | B1 | 8/2001 | Gould et al. | |
| 6,297,824 | B1 | 10/2001 | Hearst et al. | |
| 6,300,957 | B1 | 10/2001 | Rao et al. | |
| 6,304,260 | B1 | 10/2001 | Wills | |
| 6,326,988 | B1 | 12/2001 | Gould et al. | |
| 6,377,259 | B1 | 4/2002 | Tenev et al. | |
| 6,449,744 | B1 | 9/2002 | Hansen | |
| 6,628,304 | B2 * | 9/2003 | Mitchell et al. | 715/734 |
| 6,628,312 | B1 | 9/2003 | Rao et al. | |
| 6,646,652 | B2 * | 11/2003 | Card et al. | 345/645 |
| 6,654,761 | B2 | 11/2003 | Tenev et al. | |

(Continued)

OTHER PUBLICATIONS

Herman, Ivan et al., "Graph Visualization and Navigation in Information Visualization: a Survey", IEEE CS Society, 2000, pp. 1-21.
Keahey, T. Alan et al., "Techniques for Non-Linear Magnification Transformation", Proceedings of IEEE Visualization '96, Information Visualization Symposium, Oct. 28-29, 1996 (8 pp.).

(Continued)

*Primary Examiner*—Kieu Vu
*Assistant Examiner*—Patrick F Riegler
(74) *Attorney, Agent, or Firm*—Jones Day

(57) ABSTRACT

Computer-implemented methods and systems for displaying nodes on a display device, wherein the nodes have a hierarchical context. Positional information associated with a plurality of nodes is used to generate a display for the nodes. The generated node display maintains hierarchical contextual information about the nodes.

33 Claims, 13 Drawing Sheets

U.S. PATENT DOCUMENTS

| | | | |
|---|---|---|---|
| 6,693,633 B2 | 2/2004 | Loomis et al. | |
| 2002/0163517 A1 | 11/2002 | Loomis et al. | |
| 2002/0167551 A1* | 11/2002 | Steele et al. | 345/853 |
| 2003/0007002 A1 | 1/2003 | Hida et al. | |
| 2003/0067498 A1* | 4/2003 | Parisi | 345/853 |
| 2005/0273730 A1* | 12/2005 | Card et al. | 715/853 |
| 2006/0074926 A1* | 4/2006 | Yakowenko et al. | 707/100 |
| 2006/0156228 A1* | 7/2006 | Gallo et al. | 715/523 |

OTHER PUBLICATIONS

John Lamping et al., "A Focus+Context Technique Based on Hyperbolic Geometry for Visualizing Large Hierarchies", Proceedings of the ACM SIGCHI Conference on Human Factors in Computing Systems, Denver, May 1995, pp. 401-408.

Tamara Munzner, "Visualizing the Structure of the World Wide Web in 3D Hyperbolic Space", Proceedings of VRML '95, special issue of Computer Graphics, ACM SIGGRAPH, New York, 1995, pp. 33-38.

* cited by examiner

US 7,657,848 B2

COMPUTER-IMPLEMENTED NODE-LINK PROCESSING SYSTEMS AND METHODS

TECHNICAL FIELD

This document relates generally to node-link representation processing and more particularly to computer-implemented processing of node-link representations.

BACKGROUND

In the field of computer graphical user interfaces (GUIs), there is competition between the amount of space available for representing data and the usability of the interface to be produced. In representing hierarchical data, this competition is extremely important because the user of this data gains important information not only from the data itself, but also from the relationships between the data.

Historically, hierarchical data has been represented in a structured layout that helps in the understanding of parent-child relationships in the data. One approach has been to display the data in a top-down manner wherein children nodes are shown connected to their parent node with positions below the parent node. Another approach includes displaying the data in a left-right manner wherein children nodes are shown connected to their parent node with positions to the right of a parent node.

These approaches encounter multiple difficulties when the display is altered, such as when a user changes the focus of a node display. Several approaches encounter difficulty in illustrating parent-child relationship even from the initial display of the nodes. Such approaches can remove or render ambiguous the hierarchical relationship hints present in a structured hierarchical arrangement, thus making the layout more difficult to comprehend.

SUMMARY

In accordance with the teachings provided herein, computer-implemented systems and methods are provided. As an example, a method and system can be configured for providing positional information for nodes arranged in a hierarchy, wherein a node is placed on one of the hierarchy's levels. Node position data is received. A positional transformation is applied in a single dimension upon the position data of the nodes that are contained in a level in order to determine transformed position information for the nodes contained in that level. The transformation results in a warping of the positions of the particular level's nodes substantially only in one direction.

As another example, a computer-implemented method and apparatus can be configured to have a data store for storing position data associated with a plurality of nodes that are contained in a particular level of the hierarchy. Node position calculation instructions are configured to apply a positional transformation in a single dimension upon the position data of the nodes that are contained in the level in order to determine transformed position information for the nodes contained in the particular level. The transformation results in a warping of the positions of the particular level's nodes substantially only in one direction.

DETAILED DESCRIPTION

Figure 1:
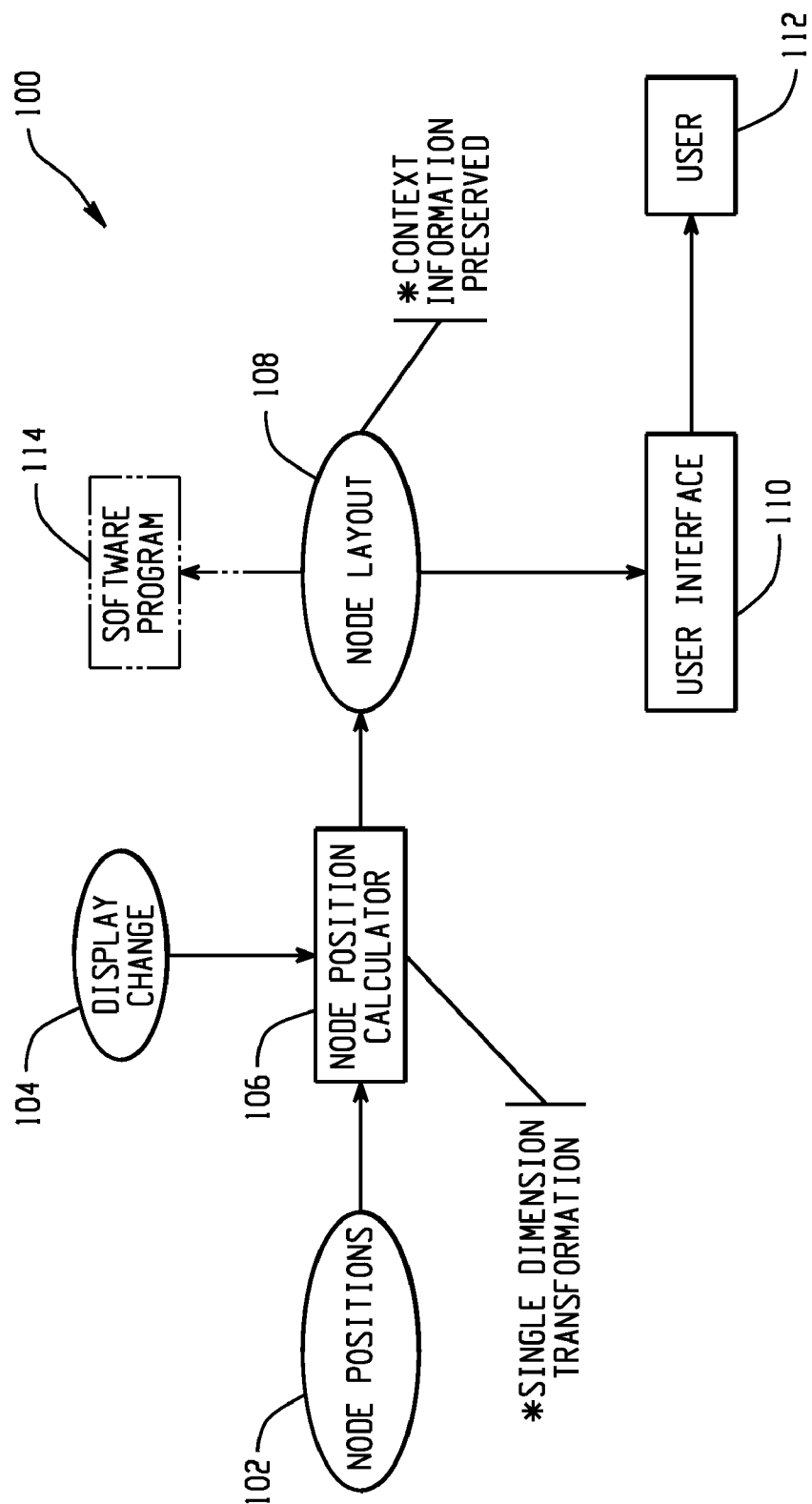
FIGS. 1 and 2 are block diagram depicting systems to generate node representations.

FIG. 1 depicts a computer-implemented system 100 that allows a change 104 in a display of nodes to occur, while preserving the contextual information associated with the nodes. The contextual information can include such aspects as the relationship between the area of interest and the rest of the diagram as well as node parent-child relationships. The display change 104 may have occurred manually by the user or automatically by a software program.

When a display change 104 is to occur, such as by changing the display's focus or viewing a portion of the display in greater/lesser detail, node positional data 102 is provided to a node position calculator software program 106. The node position calculator 106 determines new positions 108 for the nodes that maintain all or substantially most of the nodes' contextual information. All or some of the nodes (as the case may be) are displayed at their new positions 108 on a user interface 110 for a user 112, or the nodes' new positional information 108 can be provided to another software program 114 for processing by that software program 114.

The nodes can be positioned in a hierarchical arrangement, wherein a node is placed on (e.g., resides on) one of the hierarchy's levels. The node position calculator 106 applies a positional transformation in a single dimension upon the position data 102 of the nodes that are contained in a particular level in order to determine node layout data 108 for the nodes contained in the particular level. The transformation results in a warping of the positions of the particular level's nodes substantially only in one direction. The node layout data 108 for the nodes in the particular level are used in generating a display to the user 112 through a user interface 110.

The node displays may be shown in different diagram formats and orientations. Various diagrams can be used to visualize hierarchical information: 2D Trees, 3D Trees, TreeMaps, TreeRings, etc. Various orientations can be used, such as a top-down orientation, left-right orientation, (e.g., nodes are displayed such that children nodes are on the right side of the parent nodes).

Figure 2:
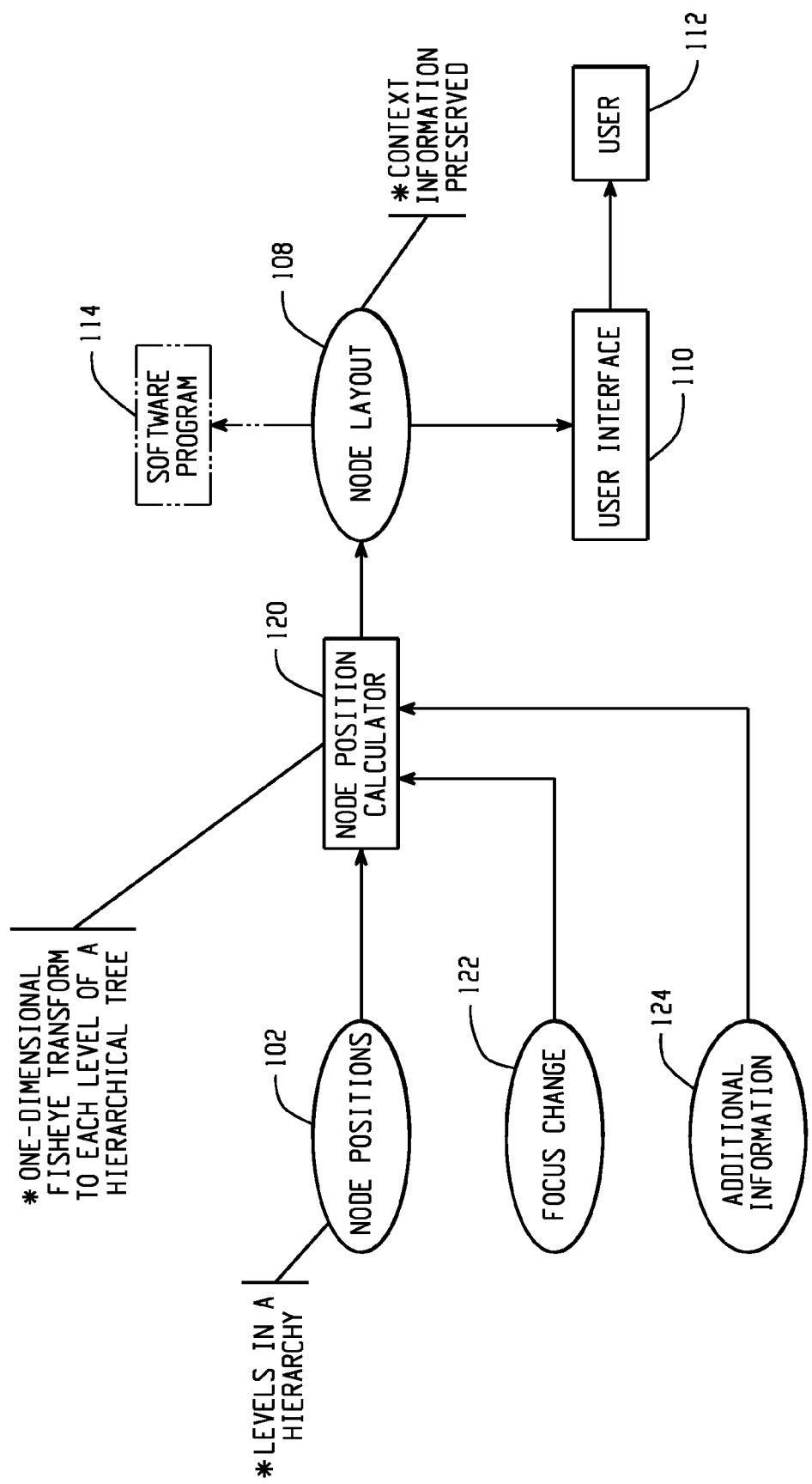

As another illustration, FIG. 2 depicts an example of a system that preserves node layout after a focus change 122 has occurred. The system allows the user to control the focus points at each level in the tree while magnifying the area around the focus.

In the example of FIG. 2, a node position calculator 120 includes functionality that can apply a one-dimensional fisheye transform to each level of a hierarchical tree. The one-dimensional fisheye processing magnifies the area horizontally (vertically for a horizontal tree) under the focal point, pushing nodes away towards the side while keeping them at the same vertical (horizontal for horizontal tree) location.

This reduces the node concentration at the focal point and nearby distances and increases it at points further away from the focal point. The fisheye transformations upon the various hierarchical levels may be independent of each other or constrained so that they magnify one particular path of the tree.

The calculator 120 can also base its computations upon other information 124 as well as node positions 102 and information about the focus change 122. Additional information 124 could include a user-defined magnification factor that should be applied in the one-dimensional transformations that occur for each level of a hierarchy. The same magnification factor value can be used for all of the hierarchical levels or different magnification factor values could be used.

In the distortion approach of FIG. 2, a display (which shows the entire tree) is "warped" or "magnified" so that the focus area is enlarged and occupies more space, and other areas are shrunk and occupy less space. This can be used to maintain a tree's focus and context. For example, this could allow the user to focus on (e.g., view in greater detail) one part of a large diagram while not preventing the user from maintaining a sense of context (e.g., the relationship between the area of interest and the rest of the diagram).

The calculator 120 can perform a one-dimensional fish-eye function so as to warp only in one direction. As an illustration, this can be achieved by calculating a distortion function as follows:

$$h(x)=\log(d*x+1)/\log(d+1),$$

where:

x=nx−fx;
d=fac(strength of the fisheye lens),
nx=node's horizontal position; and
fx=focus horizontal position.

This is used to calculate new positions for the nodes as follows:

$$nx'=h(x)+fx$$

Figure 3:
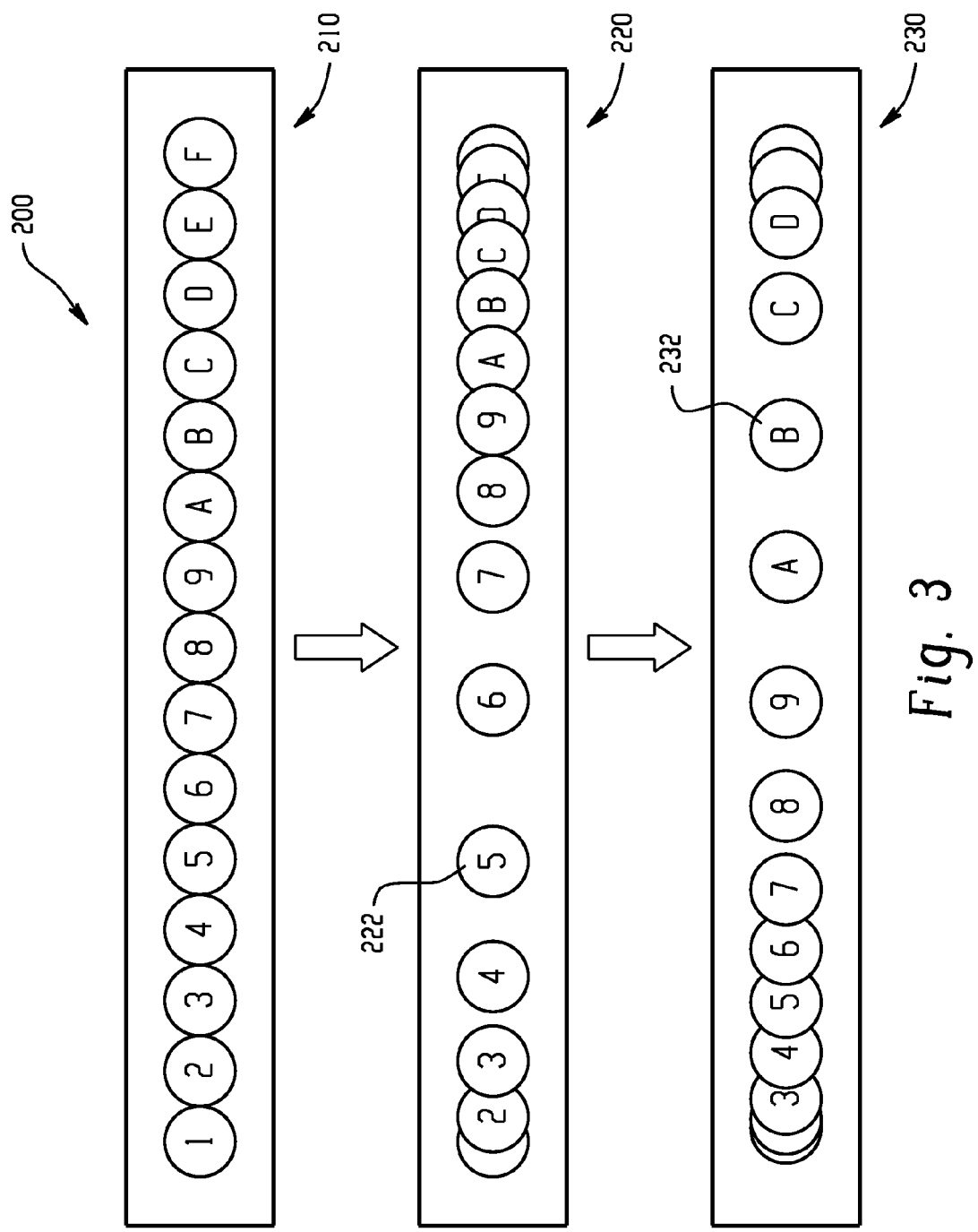
FIG. 3 is a display that illustrates the behavior of a one-dimensional fisheye lens.

FIG. 3 illustrates the behavior of applying a one-dimensional fisheye lens upon a level of nodes. With reference to FIG. 3, a plurality of nodes is shown at 200 before and after a series of transformations. Reference numeral 210 depicts a set of nodes, without any transformation. Reference numeral 220 depicts a set of nodes with a focal point 222 at the fifth node. Reference numeral 230 depicts a set of nodes with a focal point 232 that has been moved to node B. The transformations at 220 and 230 show the nodes being distorted in a single dimension (e.g., horizontally). It should be understood that distortion may occur along a dimension that is different than the horizontal dimension, such as the vertical dimension or along an axis or dimension that is not perpendicular to the edges of the display, depending upon the situation at hand.

Figure 4:
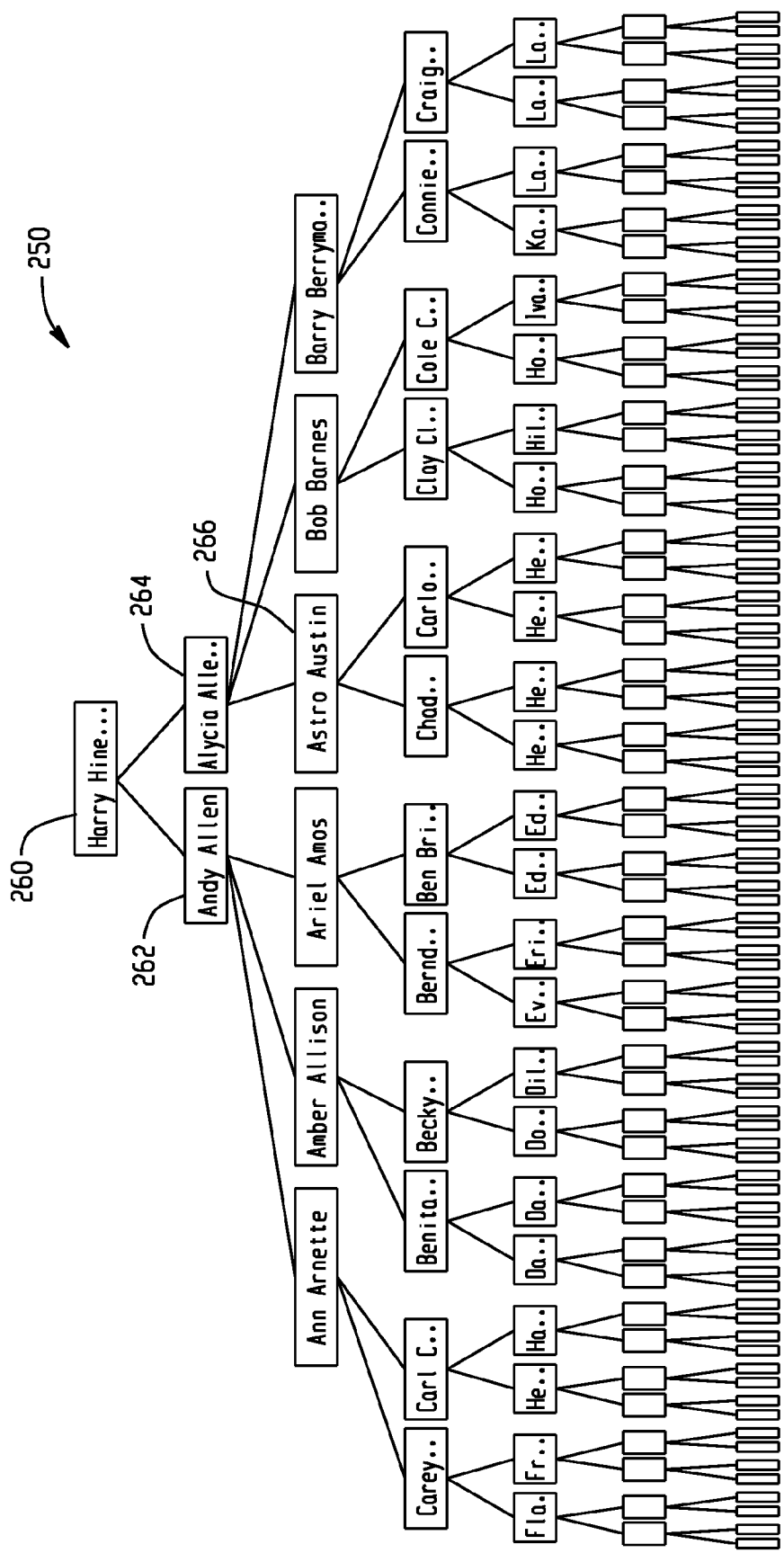
FIGS. 4-6 are screen displays depicting node representation displays.
Figure 5:
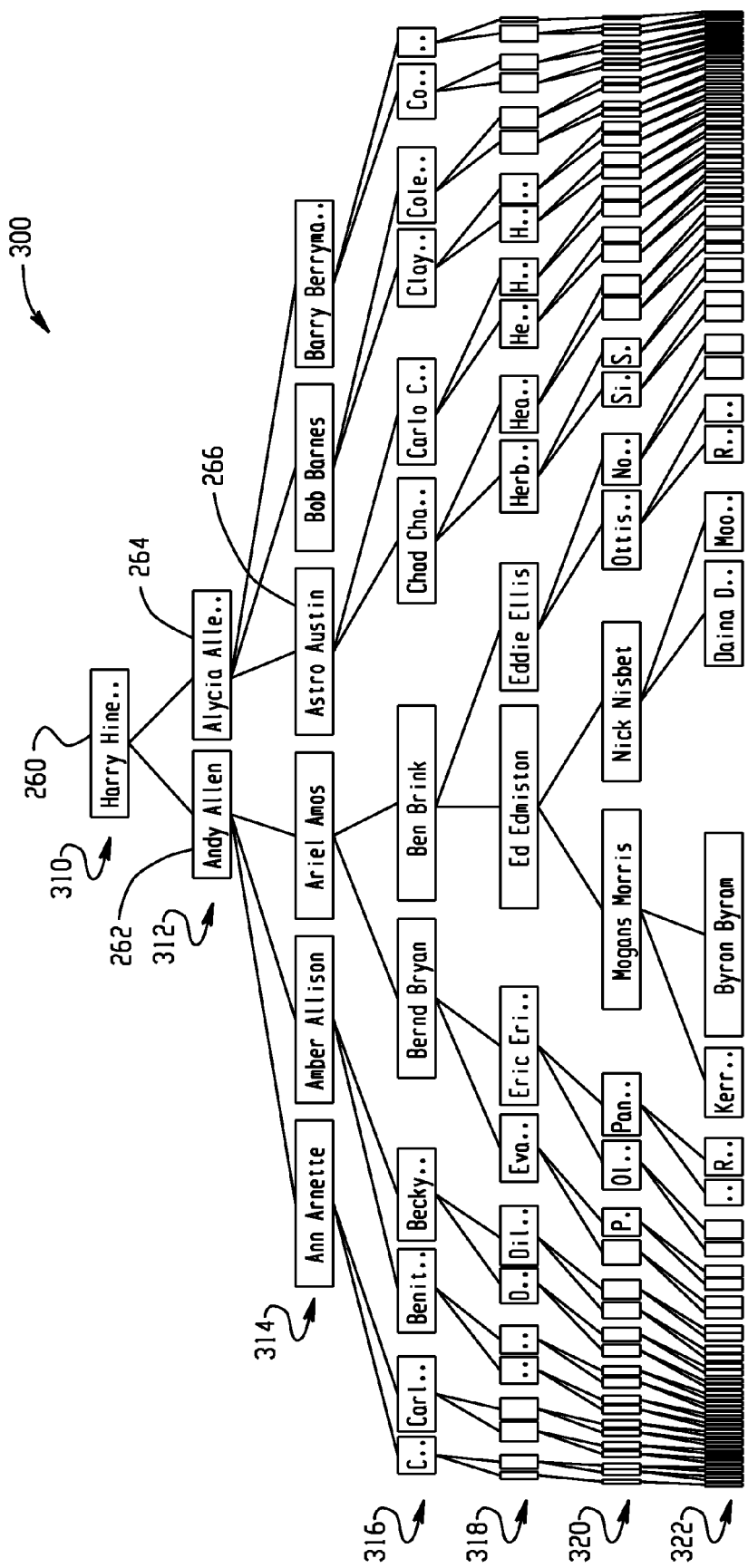

FIGS. 4 and 5 illustrate an effect of a single-dimension transformation change upon a nodal tree. FIG. 4 shows a full nodal tree 250 without any distortion and is a 2D vertical tree layout in Euclidean space. The nodal tree 250 has parent-child context information, such as the Harry Hines node 260 is the node at the apex of the nodal tree 250 and has the Andy Allen node 262 and Alycia Allen node 264 as children. These nodes themselves have children nodes (e.g., Astro Austin node 266 is the child of the Alycia Allen node 264).

FIG. 5 illustrates the effect of a fisheye transformation wherein a one-dimensional fisheye has been applied at each layer. Although a transformation has occurred, the display has maintained the tree's context information, such as the tree's parent-child relationships. For example, the Harry Hines node 260 is still the node at the apex of the nodal tree 250 and the display still shows the Andy Allen node 262 and Alycia Allen node 264 as children, etc.

In the full tree display of FIG. 5, all branches are displayed using the linear single-dimension fish-eye transform for each level (e.g., levels 310, 312, 314, 316, 318, 320, and 322) of the nodal tree hierarchy 300. However it should be understood the single-dimension transformation may be applied to fewer than all of the levels. Also it should be understood that a system and method can be configured to utilize a single-dimension transformation upon one or more levels while using a different type of transformation (if any) upon the other levels. A different type of transformation may be a typical fish-eye transformation or a transformation as described in the commonly assigned issued U.S. Pat. No. 6,693,633, which is hereby incorporated herein by reference.

Figure 6:
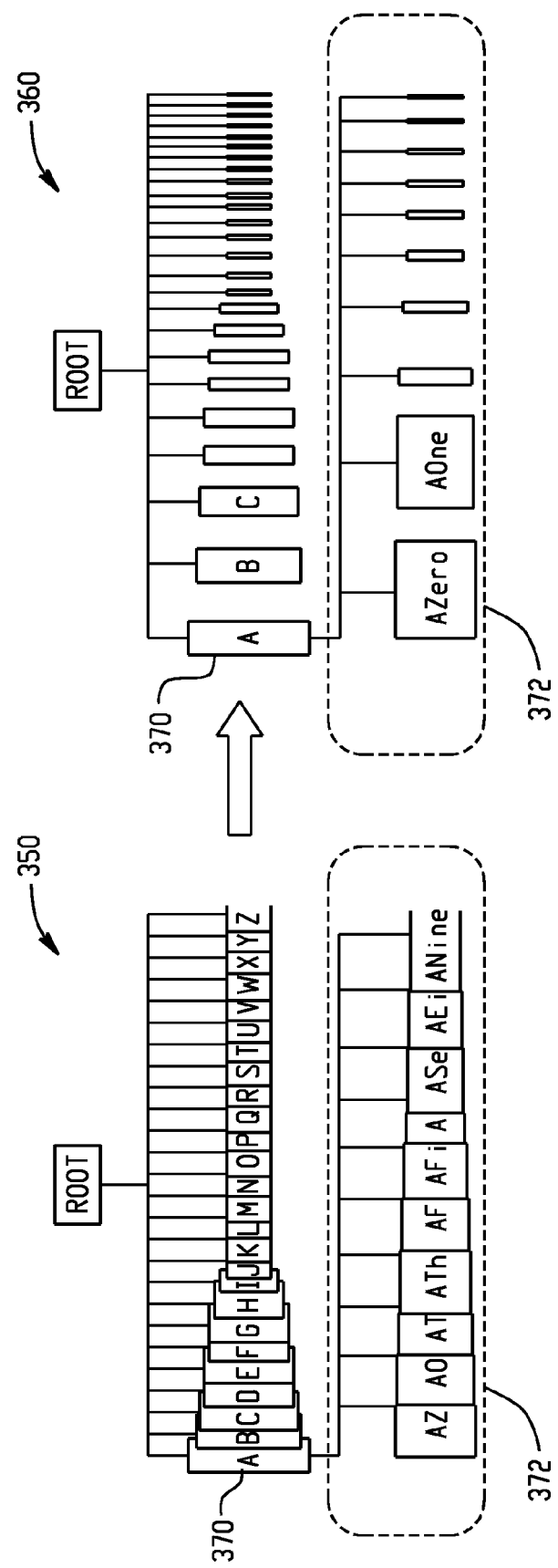

FIG. 6 illustrates the effect of single transformation on a single path version of a tree 350. In a single path view, only one of the subtrees at a level is expanded. Expanding one subtree automatically collapses any other subtree at the same level. This allows the visible subtree to occupy the entire space below the split level using a linear fish-eye transform. In the example of FIG. 6, the single path view shows the expansion of a subtree 372 for node 370.

Tree 350 is the nodal tree before a transformation, and tree 360 is the nodal tree after the transformation. A one-dimensional transformation is performed independently for each level to generate the tree 360. It is noted that in this example the height of the nodes displayed in FIG. 6 is not transformed by the fish-eye lens. In this particular case, the height of the node is mapped to a measure (e.g., the height of a node is proportional to the value of the node's measure).

Figure 7:
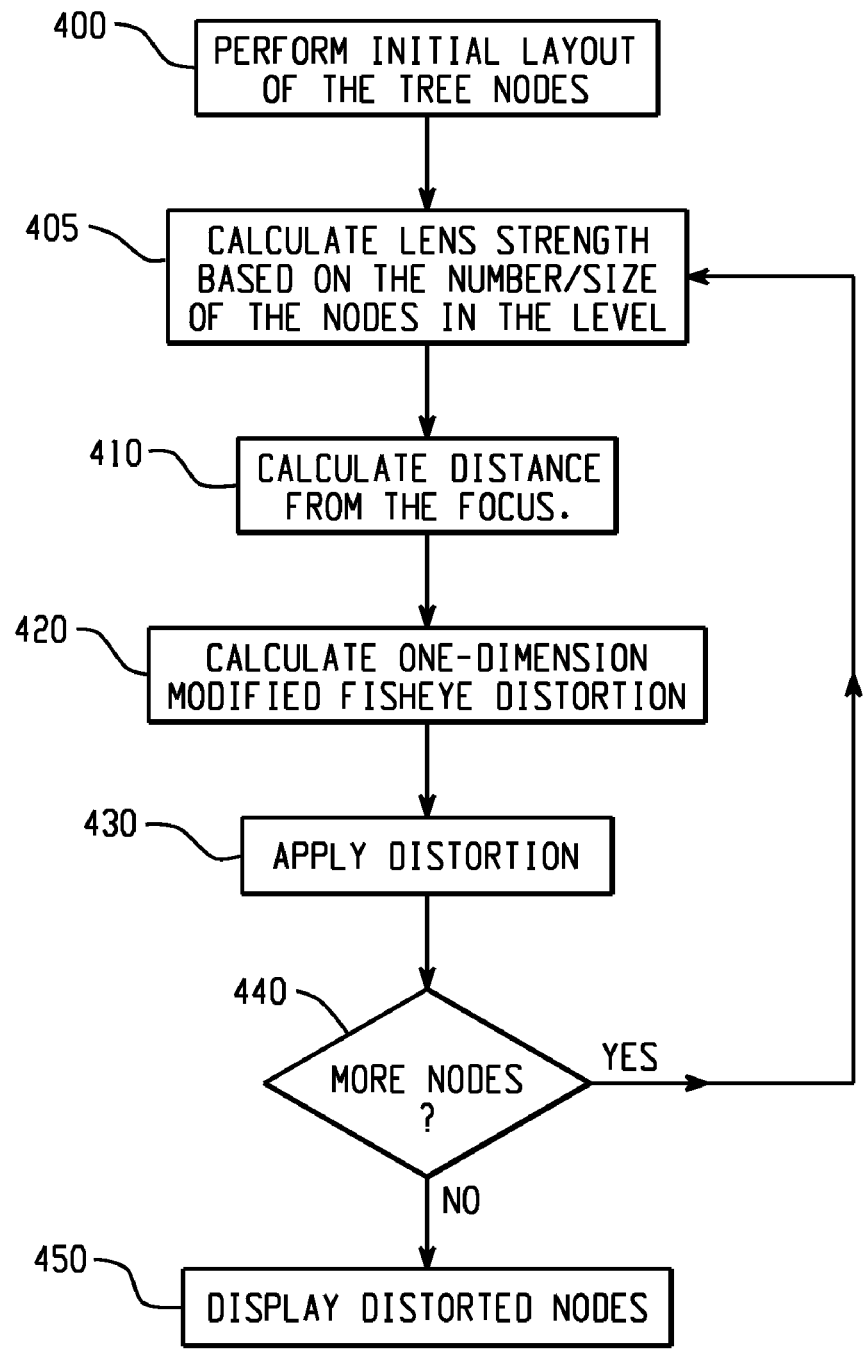
FIGS. 7 and 8 are flowcharts depicting examples of operational scenarios for generating node representations.

FIG. 7 depicts an example of an operational scenario for displaying nodes. The operational scenario (assuming a vertical tree) uses the following terms in computing node distortions:

TotalWidth: Total width of the layer
Width: Width of the display area
SwatchRadius: distance on each side from the focus point where no distortion is done. User may supply in normal units.
delta: SwatchRadius/TotalWidth
fx: the focus point's horizontal position
newX: Horizontal location of the node after distortion An operational scenario can begin in many different ways, such as by obtaining the undistorted position for a node on a tree and other information (e.g., the current focal position on the display device and the current "center" position of a tree) can be obtained. The undistorted node position may be expressed in terms of x-y coordinates on the display device. It should be understood that a user display device can include any computer visual communication device, such as a computer terminal, a lap-top screen, a PDA (personal digital assistant) screen, or other such devices. The focal position can be a location on the screen as may be specified by a user through a computer mouse or other interface device. The focal position may also have been determined by a computer software program that automatically locates areas or positions of interest on a node tree for the user. It is noted that the focal position may not always be at the center of the screen.

The operational scenario lays out at step 400 the tree using a known nodal tree layout approach. At step 405, the lens strength is computed for each layer based on the level's size (e.g., summation of all nodes' widths without distortion). An approach to compute the lens strength for each layer "i" is as follows:

Compute the total width needed to display all nodes in the layer with full level of detail: NormalizedWidth[i]=totalWidth/screen width lensStrength=Math.pow(NormalizedWidth[i], k); wherein k is a user defined constant. Default value could be 2.0

At step 410, the location of the node is obtained before any distortion (nx, ny; i.e., the node's "x" and "y" position) and its distance from the focus is calculated. At step 420, a one-dimensional distorted location is computed for the node in the layer. The distorted location may be computed in many different ways, such as the approach depicted in FIG. 8.

Figure 8:
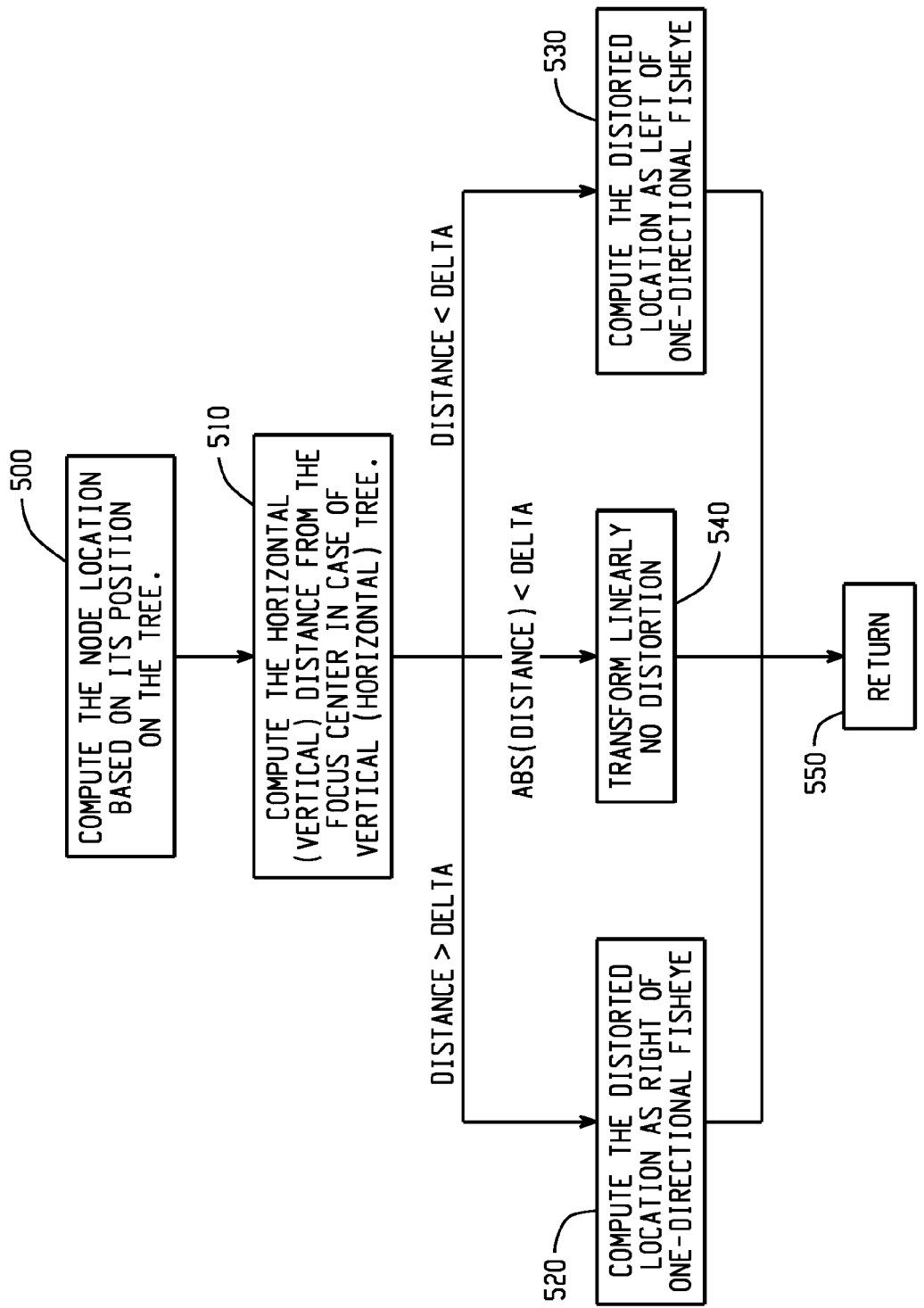

With reference to FIG. 8, the node location is computed at step 500 based on its position on the tree. At step 510, the node location (nx) is compared with the focus center (fx). If the node is right of the focus center beyond the swatch area (i.e., nx>(fx+delta)), then at step 520 the distorted location (as right of the one-directional fisheye transformation) is computed as follows:

distance=(nx−fx−delta)/(Width−fx−delta)
distortionFactor=Math.log(lensStrength*dist+1)/Math.log(lensStrength +1)
newX=fx+swatchRadius+(Width−fx−swatchRadius)*distortionFactor If the node is left of the focus center beyond the swatch area (i.e., nx<(fx−delta)), then at step 530 the distorted location (as left of the one-directional fisheye transformation) is computed as follows:

distance=(fx−nx−delta)/(fx−delta)
distortionFactor=Math.log(lensStrength*dist+1)/Math.log(lensStrength +1)
newX=fx−swatchRadius−(fx−swatchRadius)*distortionFactor If the node is inside the swatch region [i.e., nx>(fx−delta)} and {nx<(fx+delta)}], then at step 540 there is a linear transformation with no distortion as shown by the following:

newX=fx−swatchRadius*(fx−nx)/delta

Processing then continues at step 430 on FIG. 7 as indicated by the return block 550. With reference back to FIG. 7, the computed distortion is applied to the nodes.

If an option has been selected such that nodes in more than one level are to be processed as determined at decision block 440, then the distorted nodes' locations for another layer is computed by resuming execution at step 405 for another level's nodes. After the levels have been processed, then the distorted nodes are displayed at step 450.

As discussed in the operational scenario, a flat lens approach can be used when computing the distortions for the nodes. With a flat lens approach, distortion can be lessened or minimized by adding a "flat" spot in the lens where no distortion of the node size takes place.

The effect can be analogized to that of a flat piece of glass replacing a swatch through the center section of the lens, permitting the distortion effect to only occur along the left and right edge of the row. This has the benefit of keeping the textual information displayed in the nodes as useful and readable as possible while still providing a clear indication that there are more nodes being displayed than could normally fit across the page. By adjusting the distortion effect so that the nodes are allowed to overlap each other, a reasonable sense can be obtained of the number of nodes that would not fit within the flat part of the lens. The effect of clicking and dragging the mouse over a row determines the current position of the flat part of the lens. Parameters such as lens width, height, and distortion factor can be tunable.

Figure 9:
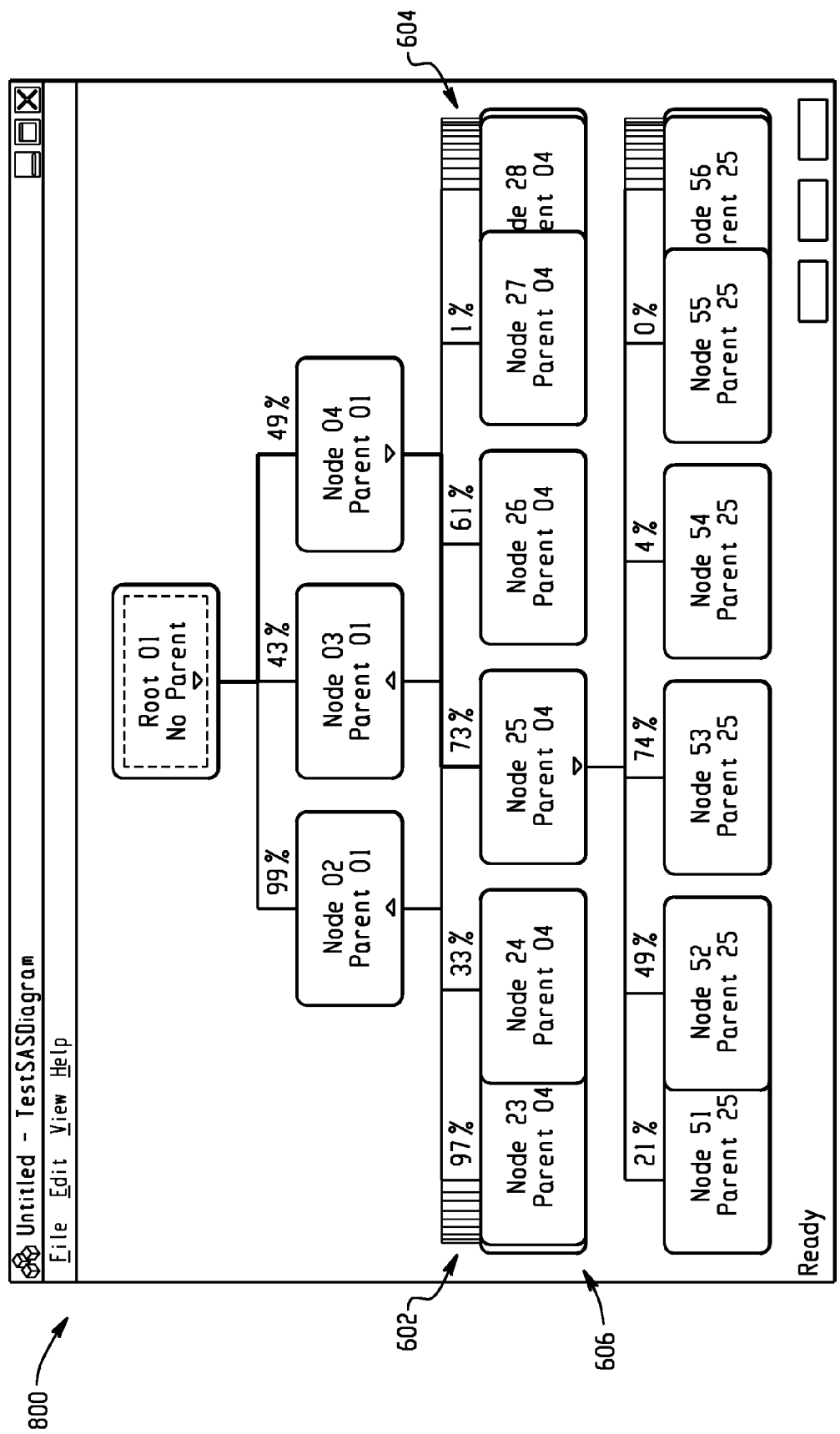
FIGS. 9 and 10 are displays depicting representations of nodes wherein focal position has been changed.

FIG. 9 shows at 600 a flat lens with a single dimension fisheye distortion and fixed node width. As shown in FIG. 9, the distortion effect is permitted only along the left edge 602 and right edge 604 of a row (e.g., row 606). The distortion effect is adjusted so that the nodes are allowed to overlap each other.

Figure 10:
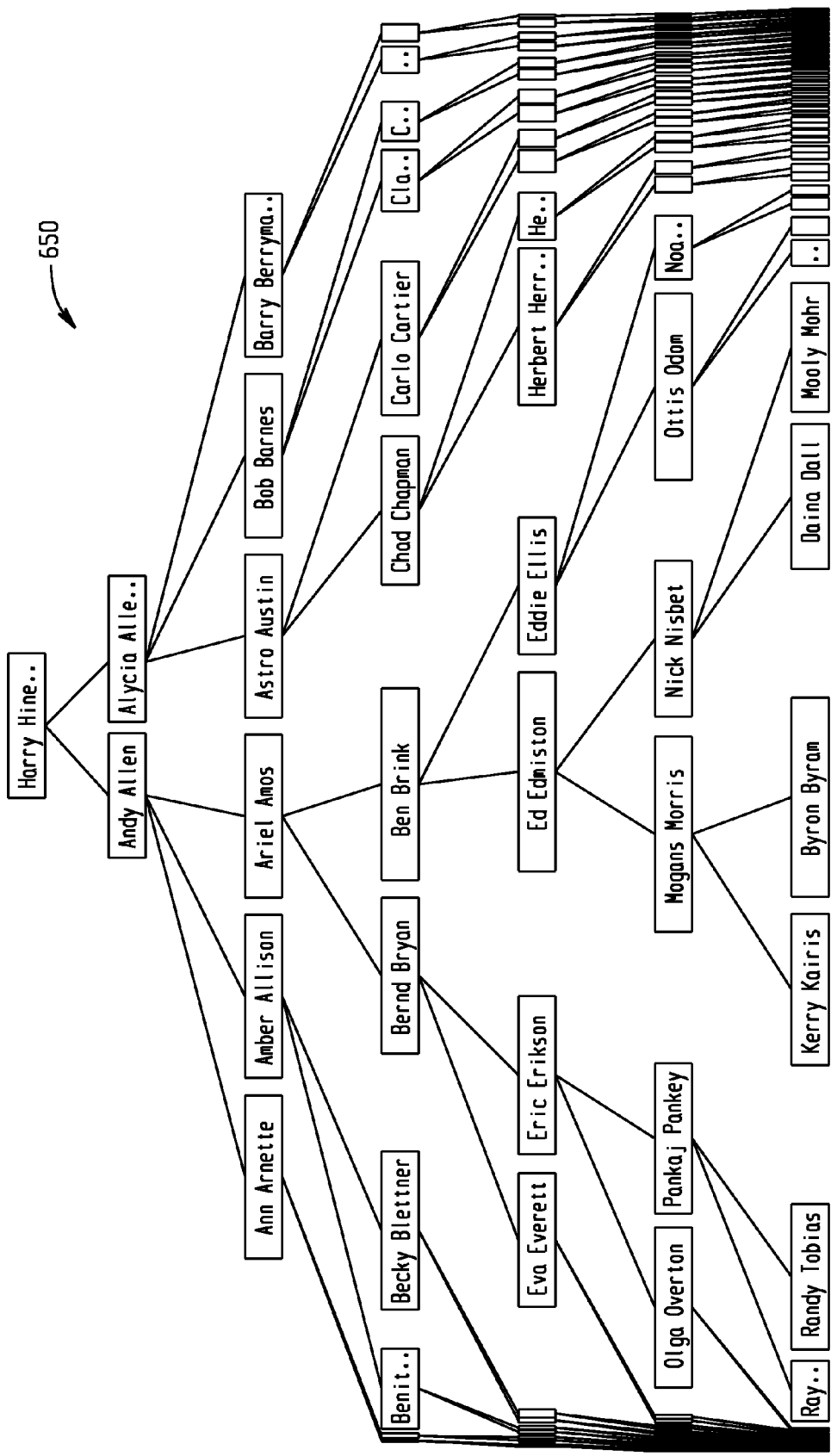

A display of nodes can also allow the nodes' width to vary. For example, if enough space is available, higher level of detail can be displayed in the node, and its width can vary in order for that higher level of detail to be shown. When space is restricted, the details of the node (e.g., name of the node, values of the node, etc.) can be suppressed. FIG. 10 provides an example of the width of node varying based on a single-dimension fish-eye transformation. More specifically, FIG. 10 shows a full tree view along with the following options: a 1D fisheye, a flat lens option, and variable level of detail option.

While examples have been used to disclose the invention, including the best mode, and also to enable any person skilled in the art to make and use the invention, the patentable scope of the invention is defined by claims, and may include other examples that occur to those skilled in the art.

As an example of the wide scope of the approaches described herein and as illustrated in FIGS. 9 and 10, a display can be configured such that all nodes are displayed, thereby not allowing only a few nodes be displayed at a time which would leave stacks of nodes on the left and right edges that are not displayed. The display can be configured such that nodes under the focal point are displayed with full detail while the others that are away from the focal point are shown with less detail. Therefore, all of the nodes are visible at all times giving the overall context. As the focus is moved, the area under the focus is magnified pushing the nodes away from the focus and thus decreasing the concentration of the nodes under the focus.

As another example, the systems and methods can be used in the display of dense node-link diagrams that graphically represent hierarchical data. These include decision trees, organizational charts, MDDB, OLAP (Online Analytical Processing) data viewers, etc. Forecast Studio and Activity Based Management software applications that are available from the assignee can utilize the systems and methods.

As another example of the wide scope of the systems and methods, a system and method can be configured such that a fisheye lens can be placed at each level of the tree, so the user can move the focus independently at each level. The strength of the lens is computed based on the concentration of the nodes at each level. If there is enough space to display all the nodes in a level, then no lens is assigned to the level. The fisheye lens can have a user defined flat area at the center. There is no distortion in the user defined area around the focus point. In this area, the user can choose to display a higher level of detail like icons.

As yet another example, nodes can display a number of properties visually by having different height and color. Additional information for the nodes can be stored in a tool tip (e.g., information displayed when a user places the mouse's pointer over an item) and through drilling down (e.g., drilling through a hierarchy).

Figure 11:
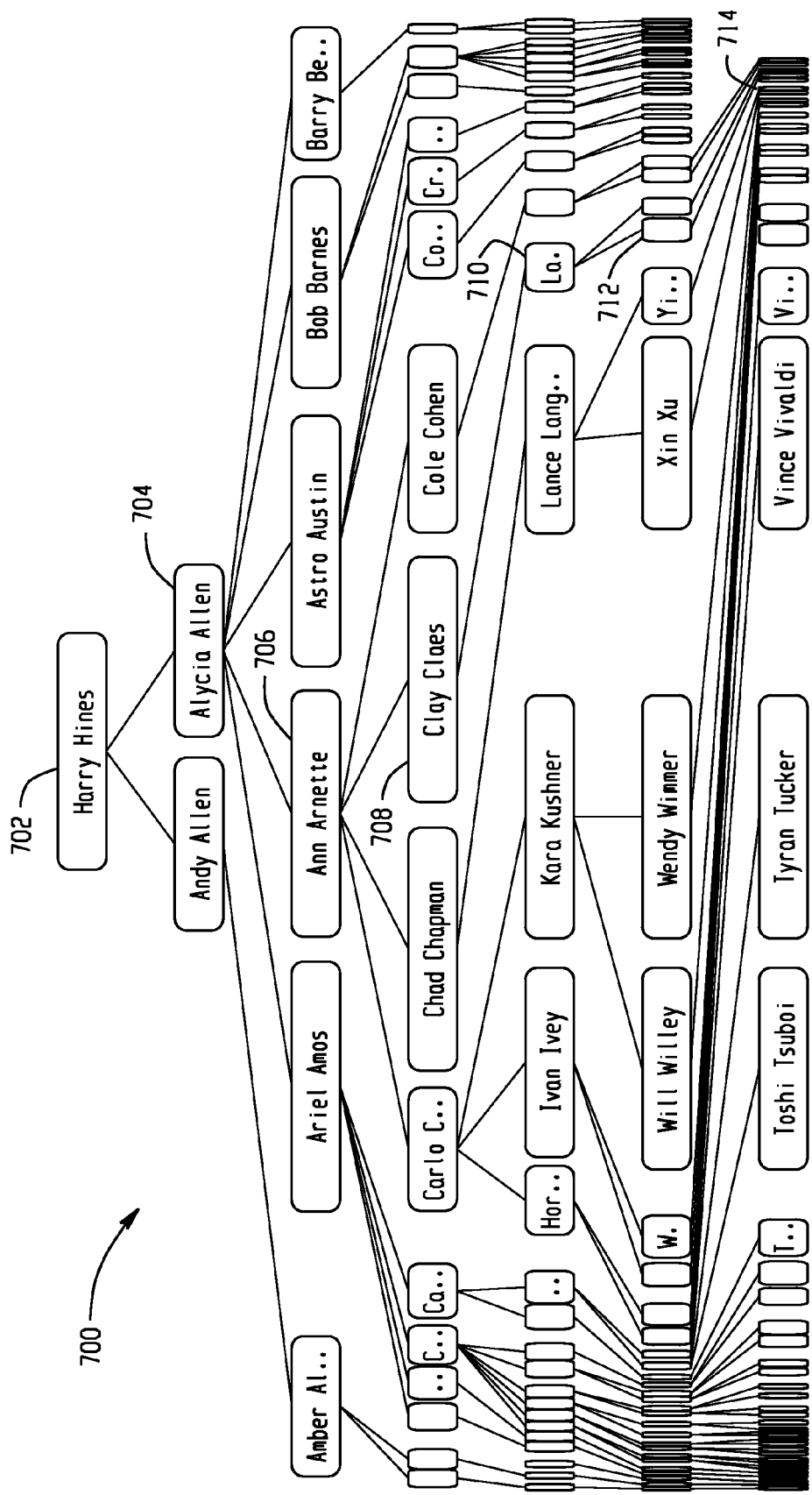
FIGS. 11 and 12 illustrate the focal point moving to ancestor nodes in levels of a tree.

It is noted that various distortion operations can be used with the systems and methods described herein. A system and method can be configured such that moving a focal point at one level results in moving other levels such that the focal point is its ancestor nodes. For example, FIG. 11 depicts a tree 700 with vertical focal points. In this case a focal point is assigned to the same horizontal value at each level. It is noted that the children of Clay Claes (node 706) are compressed to the right because the nodes on the right have more children than the nodes on the left. The configuration of FIG. 11 does not allow the display of the following whole subtree: Harry Hines 702 –>Alycia Allen 704 –>Ann Arnette 706 –>Clay Claes 708 –>Lars Lassiter 710 –>Zaid Zedlar 712 –>Arman Assa 714 with high details (i.e., focus on these nodes).

Figure 12:
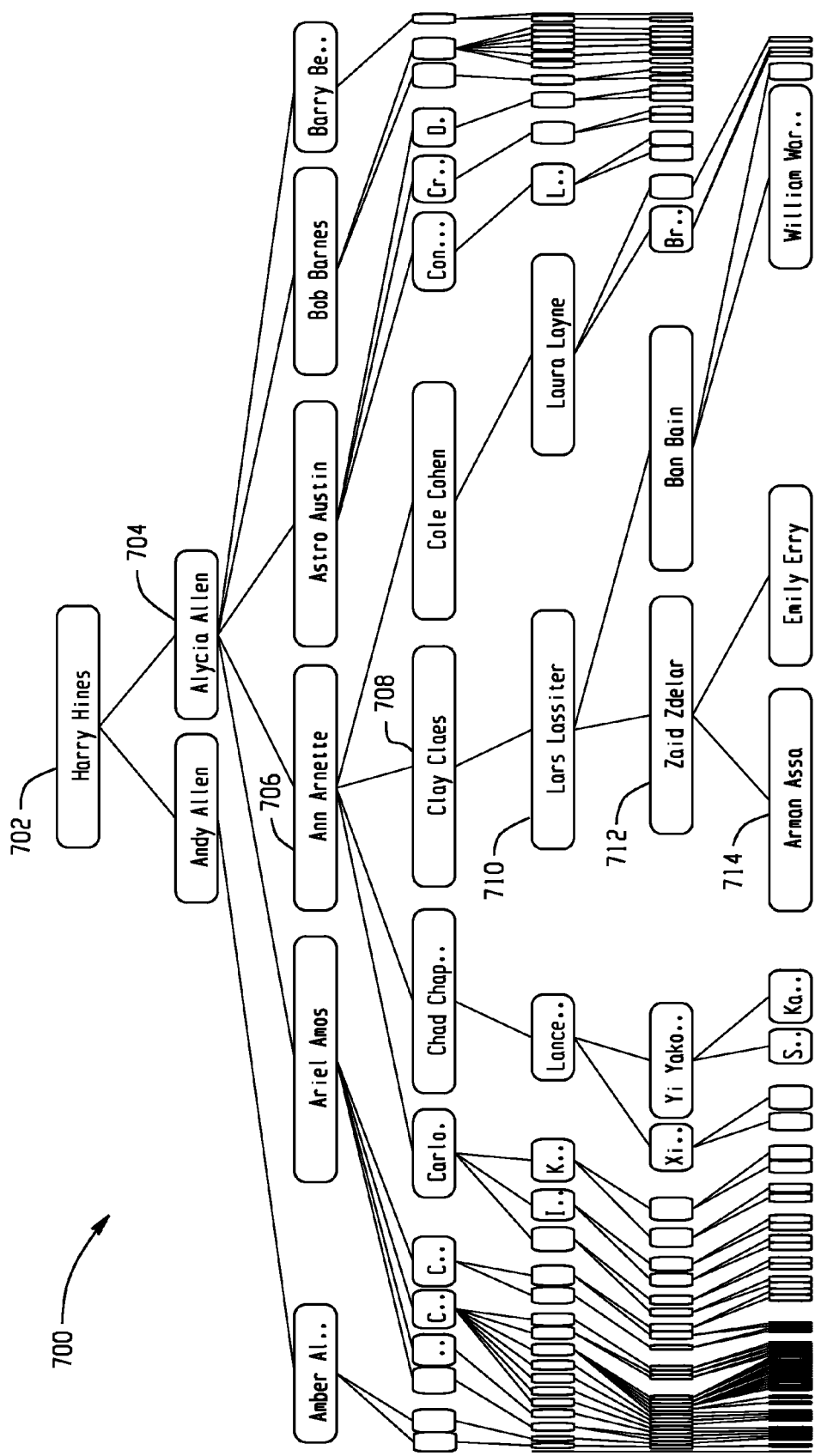

With reference to FIG. 12, instead of using the vertical focal point, if the focal point is selected based on the path from a leaf node to root node and a user drags (or otherwise indicates) the lowest level is to receive the focal point at Arman Assa, the whole subtree can be shown with full detail. In this example, at the lowest level the focal point is set at Arman Assa 714, in the next level, its parent node Zaid Zedlar 712 receives the focus, which in turn passes the focal point to Lars Lassiter 710 for next layer and so on.

Figure 13:
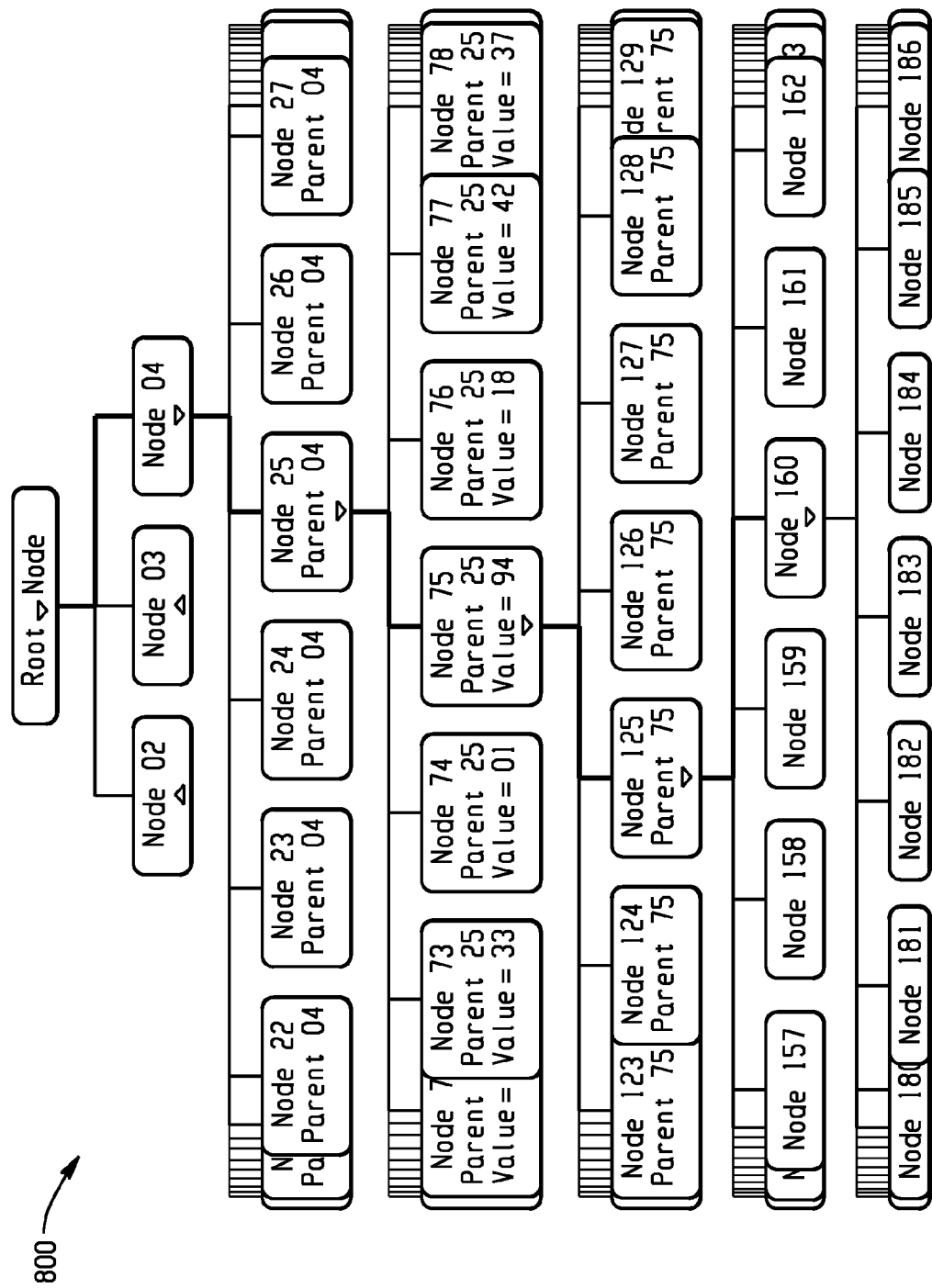
FIG. 13 illustrate performing single dimension transformations in a first dimension and then performing a single dimension transformation in a second dimension.

FIG. 13 depicts yet another example of the wide scope of different distortion operations that may be utilized with the systems and methods disclosed herein. FIG. 13 illustrates a vertical directional ("Y" dimensional) scaling of tree 800 being done after a horizontal directional ("X" dimensional) scaling has been performed. For example, one or more levels in the tree can be processed by applying a single-dimensional transformation on the one or more levels in the hierarchy in the "X" dimension. Each "X" dimensional transformation upon a level results only in a horizontal shift of left, right, or unshifted with respect to the nodes. After the levels have been transformed in the "X" dimension, then a single-dimension "Y" dimension transformation is performed upon the tree. The "Y" dimension transformation results only in a vertical shift of up, down, or unshifted with respect to the nodes. The one "Y" dimension transformation can be performed subsequent to and independent of the one or more "X" dimension transformations. After the "Y" dimension transformation is performed, the transformed nodes are displayed. The "X" and then "Y" dimension transformations could be used, for example, to fit large (or deep) trees onto a single display page. It should be understood that a different orientation of a nodal tree may result in different processing operations, such as for a horizontal tree, "Y" dimension transformations can be performed and then an "X" dimension transformation.

It is further noted that the systems and methods may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for providing positional information for nodes arranged in a hierarchy having a plurality of levels, each level having at least one dimension, the method comprising:

executing software instructions on one or more computer processors to receive position data associated with all of the nodes contained in a particular level of the hierarchy;

executing software instructions on the one or more computer processors to apply a non-linear one-dimensional mathematical distortion function upon the position data of the nodes contained in the particular level to determine transformed position information, wherein applying the non-linear one-dimensional mathematical distortion function includes performing a one-dimensional fisheye function to warp the positions of the nodes only in one direction by calculating a distortion function h(x) according to the equation h(x)=log(d*x+1)/log(d+1), wherein x is equal to nx-fx; wherein d is representative of strength of a fisheye lens; wherein nx is a node's position; wherein fx is the position of focus; and wherein new positions nx' for nodes is calculated according to the equation nx'=h(x)+fx; and executing software instructions on the one or more computer processors to use the transformed position information to generate a display including the warped positions of the nodes contained in the particular level, wherein all of the hierarchical relationships associated with all of the nodes in the particular level are maintained.

2. The method of claim 1, wherein the non-linear one-dimensional mathematical distortion function is applied in a single dimension upon position data associated with nodes in other levels of the hierarchy.

3. The method of claim 2, wherein a node in a level can be associated with a node in a different level of the hierarchy, thereby forming hierarchical contextual information, and wherein applying the non-linear one-dimensional mathematical distortion function to nodes contained in the different levels of the hierarchy maintains hierarchical contextual information associated with the nodes.

4. The method of claim 3, wherein applying the non-linear one-dimensional mathematical distortion function in a single dimension upon node positions in the hierarchy includes applying the one-dimensional non-linear mathematical distortion function to nodes in each level of a hierarchical tree.

5. The method of claim 4, wherein applying the non-linear one-dimensional fisheye transformation to the nodes in each level of a horizontal tree results in a vertical magnification of the area under the focal point, and wherein nodes in a level pushed towards the side of the display maintain their horizontal location.

6. The method of claim 4, wherein applying the non-linear one-dimensional fisheye transformation to the nodes in each level of a vertical tree results in a vertical magnification of the area under the focal point, and wherein nodes in a level pushed towards the side of the display maintain their vertical location.

7. The method of claim 1, further comprising:
executing software instructions on the one or more computer processors to use the generated display in a dense node-link diagram that graphically represents hierarchical data.

8. The method of claim 7, wherein the dense node-link diagram is for use in displaying a decision tree, organization chart, MDDB data, or OLAP data.

9. The method of claim 1, wherein the generated display includes either all branches of the hierarchy, or only expanded subtrees in the particular level.

10. The method of claim 1, wherein a focal point of a lens is configured to be placed at each level of the hierarchy so that focus can be moved independently at each level of the hierarchy; and wherein when the focus is moved from a first level in the hierarchy to a second level in the hierarchy, the distortion function is applied in a single dimension upon the position data of the nodes contained in the second level.

11. The method of claim 1, wherein the transformed position information includes scaling information for use in generating the display.

12. The method of claim 1, wherein a focal point corresponding to the focal position of a lens is configured to be placed at each level of the hierarchy, and wherein a change in focal position results in viewing one or more nodes in greater detail.

13. The method of claim 12, wherein the change in focal position is caused by a user.

14. The method of claim 13, wherein the focal position is a location on a display screen specified by the user through an interface device.

15. The method of claim 12, wherein the change in focal position is caused by a software program.

16. The method of claim 12, wherein the focal position indicates a location of interest as specified by a user.

17. The method of claim 12, wherein the focal position is located at center of the display.

18. The method of claim 12, wherein the focal position is not located at center of the display.

19. The method of claim 1, wherein the transformed position information is provided to a software program.

20. The method of claim 1, wherein the nodes convey information.

21. The method of claim 1, wherein parameters are provided to determine which nodes are displayed with full level of detail.

22. The method of claim 1, further comprising:
executing software instructions on the one or more computer processors to use the generated display in a plurality of dense node-link diagrams that graphically represent hierarchical data.

23. The method of claim 1, further comprising:
executing software instructions on the one or more computer processors to use the generated display in a decision tree, organizational chart, or OLAP (Online Analytical Processing) data viewer.

24. The method of claim 1, wherein when a first node at a particular level receives focus, the ancestor nodes of the first node become focal points for their respective levels; and wherein when the non-linear one-dimensional mathematical distortion function is applied to the position data of the nodes contained in a level, the focal point for the level is used to determine transformed position information for the nodes contained in the level.

25. The method of claim 1, further comprising:
executing software instructions on the one or more computer processors to determine whether a level has sufficient space to display all of the nodes in the level, wherein when there is insufficient space a lens is used for the level, and when there is sufficient space then a lens is not used for the level.

26. The method of claim 1, wherein applying the non-linear one-dimensional mathematical distortion function includes application in one or more dimensions of the particular level.

27. The method of claim 1, wherein when a first dimension is a horizontal dimension, a second dimension is a vertical dimension, and when a first dimension is a vertical dimension, the a second dimension is a horizontal dimension.

28. Computer-readable medium containing software instructions that are configured to cause a computing device to perform a methods comprising:
receiving position data associated with all of the nodes contained in a particular level of a hierarchy of nodes;
applying a non-linear one-dimensional mathematical distortion function upon the position data of the nodes contained in the particular level to determine transformed position information, wherein applying the non-linear one-dimensional mathematical distortion function includes performing a one-dimensional fisheye function to warp the positions of the nodes only in one direction by calculating a distortion function $h(x)$ according to the equation $h(x)=\log(d*x+1)/\log(d+1)$, wherein x is equal to nx-fx; wherein d is representative of strength of a fisheye lens; wherein nx is a node's position; wherein fx is the position of focus; and wherein new positions nx' for nodes is calculated according to the equation $nx'=h(x)+fx$; and
using the transformed position information to generate a display including the warped positions of the nodes contained in the particular level, wherein all of the hierarchical relationships associated with all of the nodes in the particular level are maintained.

29. A computer-implemented apparatus for providing positional information for nodes arranged in a hierarchy having a plurality of levels, the apparatus comprising:
a computer-readable storage medium for storing position data associated with all of the nodes contained in a particular level of the hierarchy; and
node position calculation instructions configured to:
apply a non-linear one-dimensional mathematical distortion function upon the position data of the nodes contained in the particular level to determine transformed position information, wherein applying the non-linear one-dimensional mathematical distortion function includes performing a one-dimensional fisheye function to warp the positions of the nodes only in one direction by calculating a distortion function h(x) according to the equation $h(x)=\log(d*x+1)/\log(d+1)$, wherein x is equal to nx-fx; wherein d is representative of strength of a fisheye lens; wherein nx is a node's position; wherein fx is the position of focus; and wherein new positions nx' for nodes is calculated according to the equation $nx'=h(x)+fx$; and use the transformed position information to generate a display including the warped positions of the nodes contained in the particular level, wherein all of the hierarchical relationships associated with all of the nodes in the particular level are maintained.

30. The method of claim 1, wherein the non-linear one-dimensional mathematical distortion function comprises a logarithmic transformation.

31. The method of claim 1, wherein the non-linear one-dimensional mathematical distortion function is applied within a single region including; at least four consecutive nodes contained in the particular level.

32. The method of claim 1, wherein application of the non-linear one-dimensional mathematical distortion function results in non-linearity with respect to at least four consecutive nodes contained in the particular level.

33. A computer-implemented system for providing positional information for nodes arranged in a hierarchy having a plurality of levels, the system comprising:

a processor;

a computer-readable storage medium containing software instructions executable on the processor to cause the processor to perform operations including:

receiving position data associated with all of the nodes contained in a particular level of a hierarchy of nodes;

applying a non-linear one-dimensional mathematical distortion function upon the position data of the nodes contained in the particular level to determine transformed position information, wherein applying the non-linear one-dimensional mathematical distortion function includes performing a one-dimensional fisheye function to warp the positions of the nodes only in one direction by calculating a distortion function h(x) according to the equation $h(x)=\log(d*x+1)/\log(d+1)$, wherein x is equal to nx-fx; wherein d is representative of strength of a fisheye lens; wherein nx is a node's position; wherein fx is the position of focus; and wherein new positions nx' for nodes is calculated according to the equation $nx'=h(x)+fx$; and using the transformed position information to generate a display including the warped positions of the nodes contained in the particular level, wherein all of the hierarchical relationships associated with all of the nodes in the particular level are maintained.

* * * * *

UNITED STATES PATENT AND TRADEMARK OFFICE
CERTIFICATE OF CORRECTION

PATENT NO. : 7,657,848 B2
APPLICATION NO. : 11/328410
DATED : February 2, 2010
INVENTOR(S) : Yakowenko et al.

It is certified that error appears in the above-identified patent and that said Letters Patent is hereby corrected as shown below:

In column 10, line 32, delete the word "the".

In column 10, line 35, insert a comma after the word "methods".

In column 11, line 21, delete "including;" and insert -- including --.

Signed and Sealed this

Twentieth Day of April, 2010

David J. Kappos
*Director of the United States Patent and Trademark Office*